US005170548A

United States Patent [19]

Ramirez

[11] Patent Number: 5,170,548

[45] Date of Patent: Dec. 15, 1992

[54] TRAILER WHEEL HUB PULLING DEVICE

[76] Inventor: Esaul Ramirez, 5153 South Hamlin Ave., Chicago, Ill. 60632

[21] Appl. No.: 750,649

[22] Filed: Aug. 26, 1991

[51] Int. Cl.[5] ............ B23D 19/04

[52] U.S. Cl. ............ 29/264; 29/266

[58] Field of Search ............ 29/258, 263, 264, 265, 29/266

[56] References Cited

U.S. PATENT DOCUMENTS

| | | | |
|---|---|---|---|
| 984,978 | 2/1911 | Straub | 29/258 |
| 1,001,644 | 8/1911 | Hutchings | 7/100 |
| 1,230,448 | 6/1917 | Tuttle | 29/264 |
| 1,310,143 | 7/1919 | Cantrell et al. | 89/45 |
| 1,858,238 | 5/1932 | Cornwell | 29/264 |
| 2,684,527 | 7/1959 | Hedlund | 29/266 |
| 4,697,323 | 10/1987 | Sauvagean | 29/264 |
| 4,709,459 | 12/1987 | Klann | 29/263 |
| 4,908,925 | 3/1990 | Johnson | 29/260 |

*Primary Examiner*—Bruce M. Kisliuk
*Assistant Examiner*—Eileen P. Morgan
*Attorney, Agent, or Firm*—Dvorak and Traub

[57] ABSTRACT

A cargo trailer wheel hub puller has a housing provided with a hub which loosely supports a bushing internally provided with threads. A pin passes through a hole in the hub to maintain the bushing in the hub. The bushing is provided with a collar which abuts an internal wall in the housing. A threaded rod passes in thread engagement through the bushing. The end of the rod inside the housing is provided with a contact pad which is adapted to apply a force against a vehicle axle while a torque force is applied to the other end of the rod so that the housing, which is attached to the structure of the trailer wheel hub is forced outwardly over the vehicle axle. The bushing is made from a milder steel than the rod so that, upon wearing out, it can be readily replaced by removing the pin and replacing the bushing. The housing is provided at one of its ends with a flange having a distribution of spaced apertures which are arranged to align with any type of configured lug or threaded hole arrangement on the trailer wheel hub. A modified housing has an end externally threaded to engage an internally threaded drum on a trailer wheel hub. The bushing is loosely supported inside the hub and loosely maintained by the pin in the hub so that the bushing can be more readily aligned with the vehicle axle.

18 Claims, 3 Drawing Sheets

FIG. 1
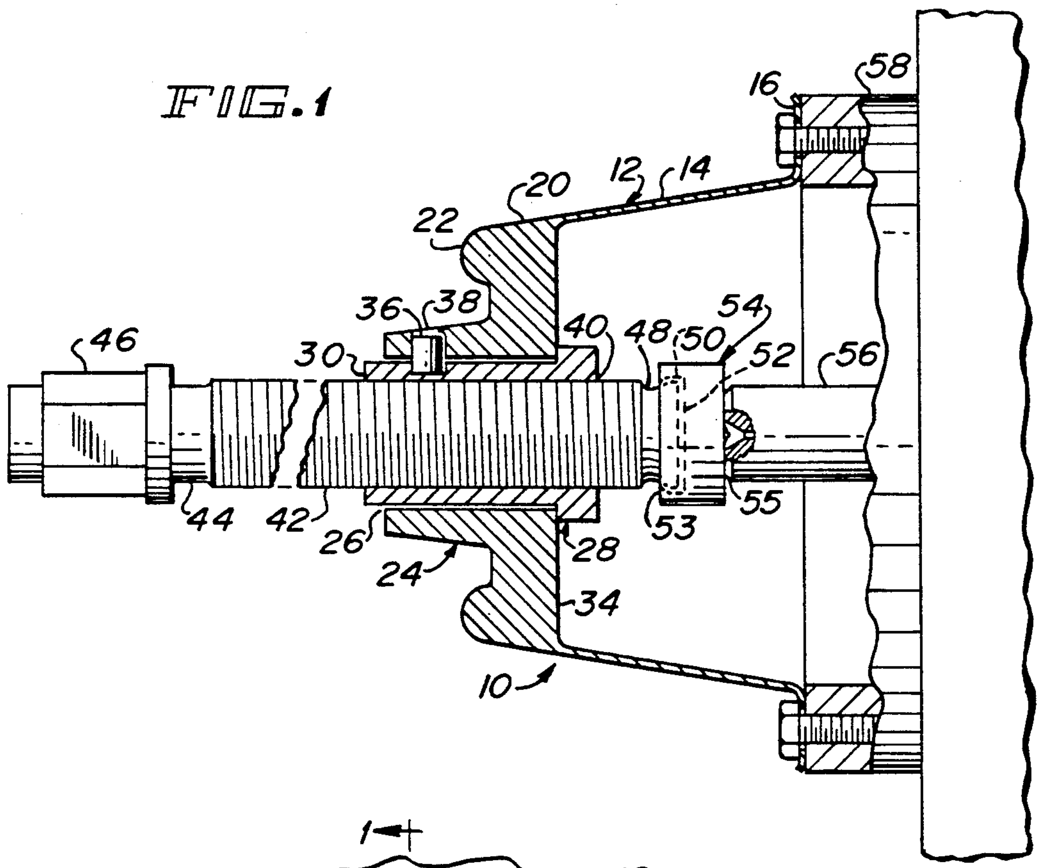
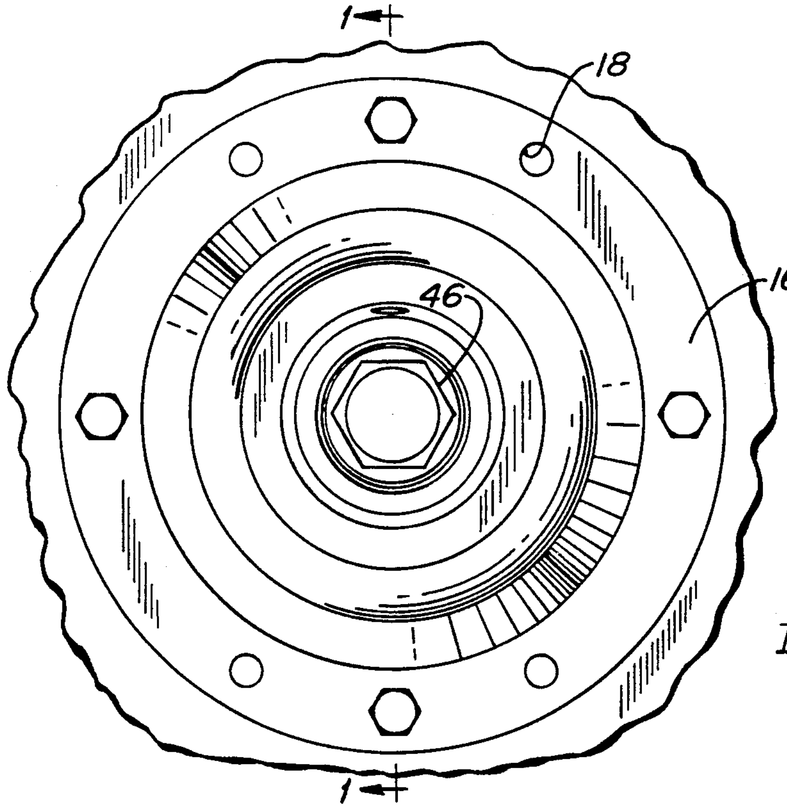
FIG. 2

FIG. 4
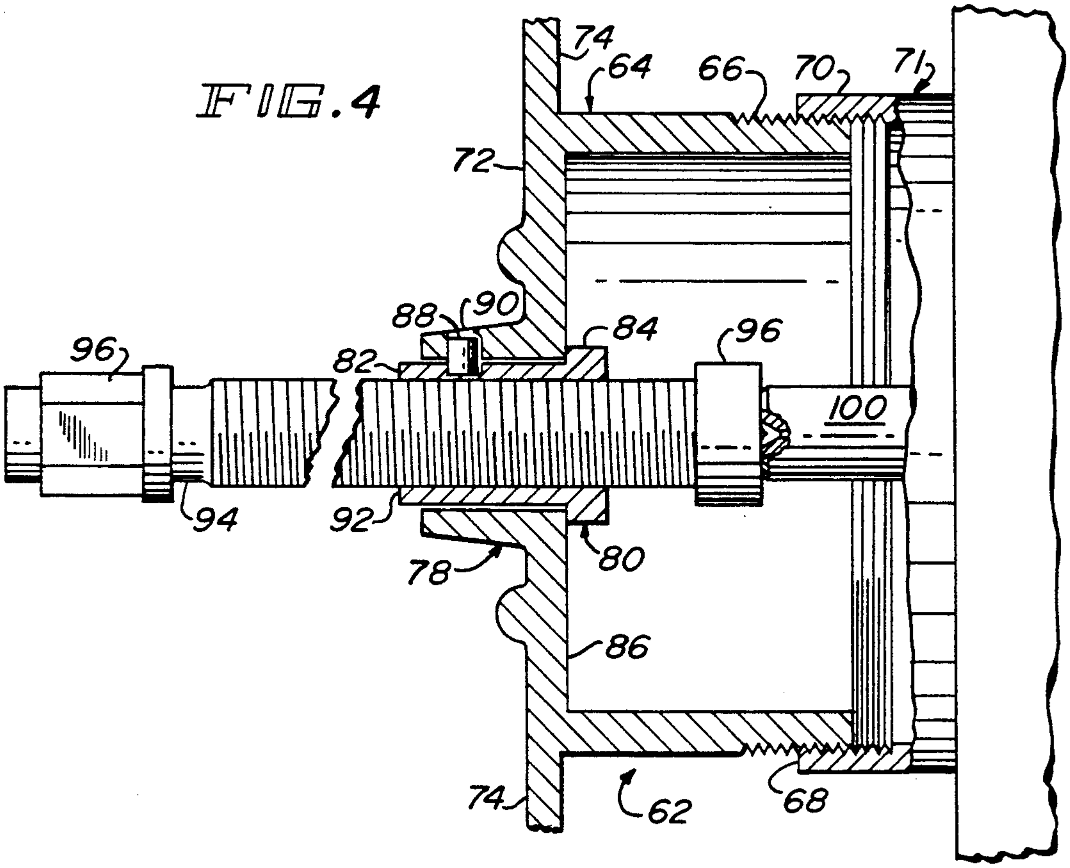
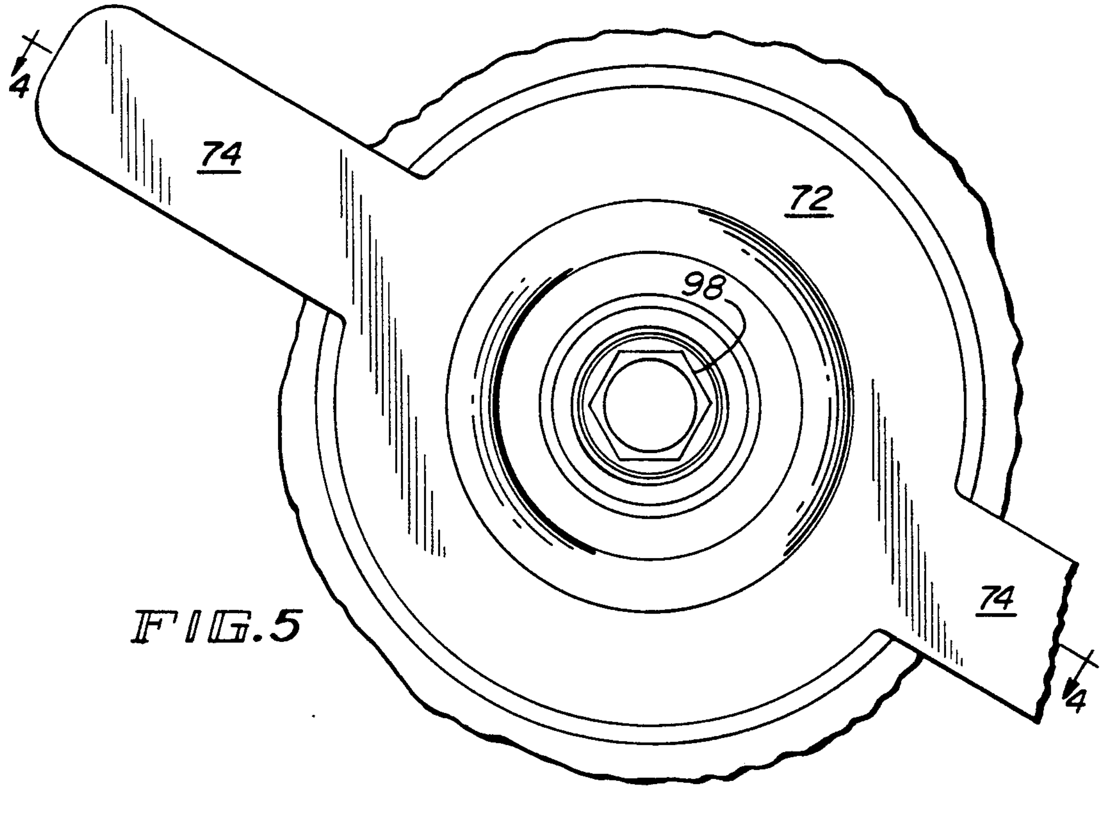
FIG. 5

TRAILER WHEEL HUB PULLING DEVICE

BACKGROUND OF THE INVENTION

1. Field of the Invention

This invention is concerned with a device for pulling off a wheel hub on a vehicle, and more particularly to a device for removing wheel hubs on truck trailers having different type wheel arrangements.

2. Description of the Prior Art

There are many types of devices for pulling off wheels. However, most of them are concerned with self-propelled vehicles which have a different type of wheel hub construction than wheel hub constructions on the wheels of truck trailers. For example, U.S. Pat. No. 1,310,154 describes a wheel puller which has a hollow housing provided with an internally threaded surface adapted to engage with an external threaded surface on a wheel hub, the device having a threaded rod which is threaded against the end of the vehicle axle and thereby exerting a force to pull the wheel hub off the axle. This type of device is limited only to wheel hubs having an externally threaded surface. Another wheel-pulling device is described in U.S. Pat. No. 1,230,448, which is quite similar to the device discussed in the preceding patent, except that this device has a split collar having an internally threaded surface adapted to engage with an external threaded surface on the wheel hub. None of the described known devices are capable of removing wheel hubs on truck trailers.

SUMMARY OF THE INVENTION

Generally speaking, in accordance with the present invention, a trailer wheel hub puller is provided and which is capable of handling a variety of known wheel hubs on differently constructed cargo carrying trailers. The puller device has a substantially circular hollow housing having one end adapted to be secured to a trailer wheel hub, and the other end being reinforced and threadedly supporting a threaded rod which is adapted to engage the end of a wheel axle and exert an opposing force for withdrawing the wheel hub off the wheel axle. In one form of the invention, the housing is provided with a flange having a predetermined radial distribution of apertures which are capable of servicing any number of wheel hubs having various radial distributions of threaded bores. In another form of the invention, the housing is tubular, having one end provided with an externally threaded surface adapted to mate and engage with an inner threaded surface on a drum of a wheel hub. The other end is closed by a hub wall threadedly engaged with a threaded rod having one end to engage a wheel axle and exert a pulling force on the wheel hub.

Accordingly, it is an object of this invention to provide a trailer wheel hub puller which can be used with all types of trailer wheel hub configurations.

A further object of the invention is to provide an improved trailer wheel hub puller which can be readily used with different types of wheel hubs.

A still further object of the invention is to provide a trailer wheel hub puller having a threaded bushing which can be readily replaced upon wearing out.

A still further object of the invention is to provide a trailer wheel hub puller having a housing supporting with a high tolerance a bushing threadedly engaged with a threaded rod.

Still other objects and advantages of the invention will in part be obvious and will in part be apparent from the specification.

The invention comprises the features of constructions, combination of elements, and arrangement of parts which will be exemplified in the constructions hereinafter set forth, and the scope of the invention will be indicated in the claims.

BRIEF DESCRIPTION OF THE DRAWINGS

For a fuller, understanding of the invention, reference is made to the following description taken in conjunction with the accompanying drawings, in which:

FIG. 1 is a side elevation cross-sectional view of a trailer wheel puller, taken along the line 1—1 of FIG. 2;

FIG. 2 is an end view of the trailer wheel hub puller shown in FIG. 1;

FIG. 4 is a side elevation cross-sectional view of another embodiment of a trailer wheel hub puller, taken along the line 4—4 of FIG. 5; and FIG. 5 is an end view of the trailer wheel hub puller shown in FIG. 4.

DESCRIPTION OF THE PREFERRED EMBODIMENTS

Figure 3:
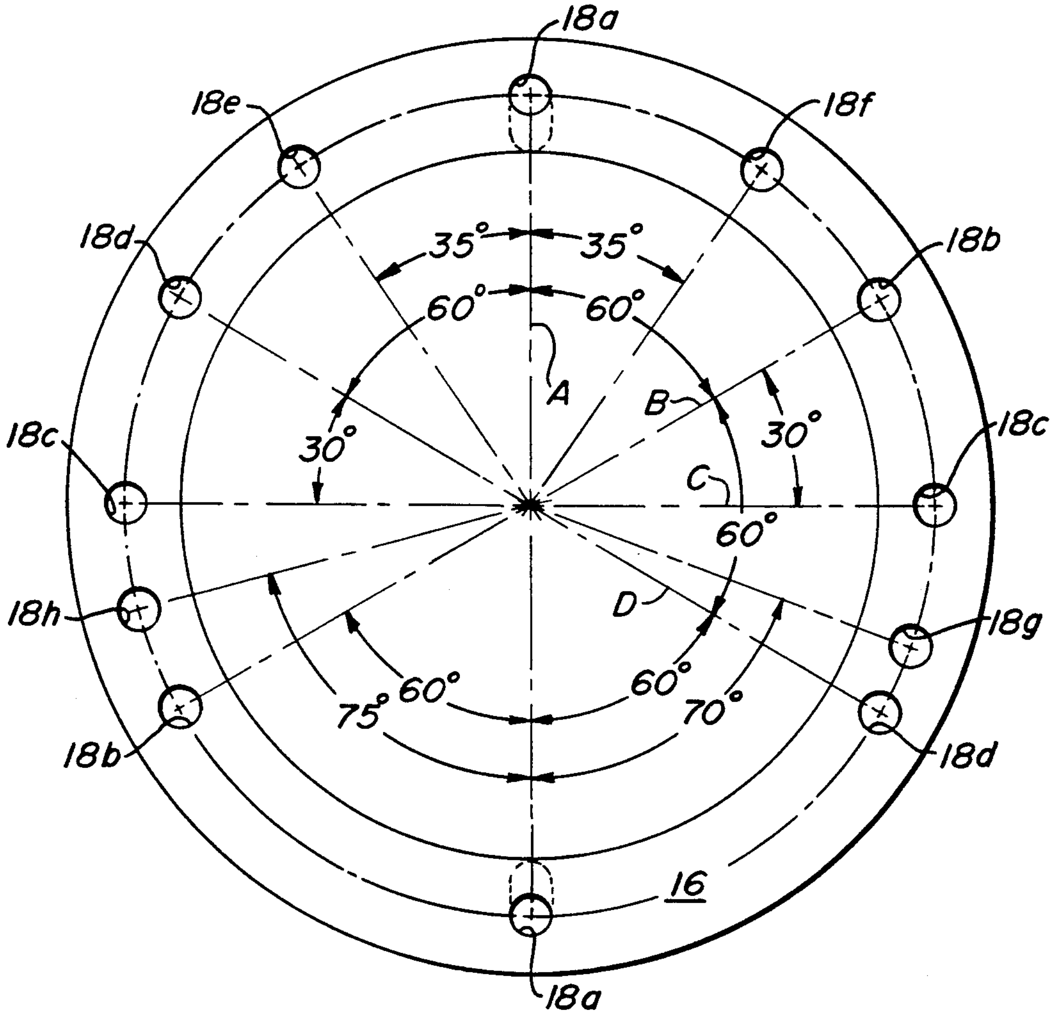
FIG. 3 is a schematic showing the distribution of apertures adapted to accommodate different distributions of lugs on various trailer wheel hubs.

A trailer wheel hub puller 10, as shown in FIGS. 1 and 2, has a bell-shaped housing 12 which has a conical wall 14 having one end terminating in a flange 16 which is provided with a plurality of apertures 18 distributed along the flange 16. The other end of the conical wall 14 terminates in a thick base 20 having a ridge 22 concentrically located with respect to a hub portion 24 having a bore 26 which loosely supports a bushing 28 having a sleeve 30 having one end terminating in a collar 32 which abuts an interior wall 34 of the base 20. A pin 36 passes through a hole 38 in the hub portion 24 to secure the bushing 28 in the hub portion 24. The bushing 28 and the pin 36 are loosely accommodated in their respective openings. An internal wall 40 of the bushing 28 is provided with threads engageable with threads 42 on a threaded rod 44 having one end terminating in a hexagonal head 46, and another end terminating in a portion 48 having a reduced diameter and ending in a bulbous flange 50 which is forced into a bore 52 in a contact pad 54. The bore 52 has a reduced neck 53. The diameter of the neck 53 is slightly less than the diameter of the bulbous flange 50 so that, after the bulbous end is forced into the bore 52, a loose permanent connection is established between the reduced portion 48 and the contact pad 54.

As shown in FIG. 1, the contact pad 54 is positioned against an end 55 of a wheel axle 56 passing through a trailer wheel hub 58. The housing 12 is secured to the trailer wheel hub 58 by bolts 60.

By applying a clockwise torque to the hexagonal head 46 on the rod 44, increased pressure will be developed between the contact pad 54 and the end of the axle 56 to thereby move the trailer wheel hub 58 off the wheel axle 56. The loose mounting of the bushing 28 in the hub portion 24 and the loose mounting of the pin 36 enable the rod 44 to be more precisely aligned with the axis of the wheel axle 56.

During an extensive use of wheel pullers, wear will occur, and then it is necessary to replace the entire device. With the present invention, the bushing 28 is made from a milder steel, as opposed to the steel used in the rod 44. Therefore, the bushing 28 will wear out faster and can be readily replaced with another bushing.

As shown in FIG. 3, the trailer wheel hub puller 10 has a wide series of apertures 18a–18h distributed along the flange 16. Some of the apertures are symmetrically disposed with respect to each other, for example, apertures 18a, 18b, and 18d. By symmetrical distribution is meant that there are pairs of apertures which are directly spaced across each other on a diametrical line, whereas apertures 18f, 18g, 18h, and 18e do not have a diametrical counterpart. Diameter lines B and D are disposed angularly with respect to each other by 60°. Also, they are angularly disposed with respect to diameter line A by 60°. Aperture 18f and aperture 18e are disposed with respect to diameter line A by 35°. Aperture 18g is angularly located from diameter line A by 70°, and aperture 18h is located from the diameter line A by 75°. The dispersion of the apertures along the flange 16 is such that the trailer wheel hub puller can be used universally with all types of wheel hub configurations.

Another embodiment of a trailer wheel hub puller 62 is shown in FIGS. 4 and 5, wherein the puller 62 has a cylindrical housing 64 defining a drum having one end provided with a threaded surface 66 adapted to engage with a threaded surface on the interior wall of a drum 70 of the trailer wheel hub 71. The other end of the cylindrical housing 64 is integrally formed with a plate 72 which has a pair of diametrically opposed extending arms 74. The plate 72 is provided with a ridge 76 which is concentric to an integrally formed hub portion 78 which loosely supports a bushing 80 which has a sleeve 82 having one end terminating in a collar 84 abutting an interior wall 86 of the plate 72. The bushing 80 is maintained inside the hub portion 78 by means of a pin 88 loosely located in a hole 90 in the hub portion 78. A bore 92 in the bushing 80 is provided with threads to engage with threads on a rod 94 which has one end supporting a contact pad 96 in the same manner as previously described in reference to the contact pad 54 shown in FIG. 1. The other end of the rod 94 terminates in a hexagonal head 98.

In order to remove a trailer wheel hub from a wheel axle 100 of a vehicle, the trailer wheel hub puller is placed against the drum 70 on the trailer wheel hub to engage the threaded surfaces 66 and 68 on the cylindrical housing 64 and the drum 70, respectively. Thereafter, a clockwise rotation is imparted to the puller by means of the arms 74 until a substantial threaded engagement is obtained. Thereafter, clockwise rotation is applied with a tool, such as a wrench, to the hexagonal head 98 to rotate the rod 94 so that the contact pad 96 is abutted against the end of the wheel axle 100. Further application of a torque force to the hexagonal head 98 will cause the rod 94 to enable the puller 62 to pull the trailer wheel hub 71 off the wheel axle 100. The ridge 76 adds reinforcement to the plate 72 to prevent substantial flexing when rotational force is applied to the rod 94.

The materials forming the bushing 80 and the rod 94 are the same as was explained in reference to the first embodiment in FIGS. 1–3, so that, after an extensive use of the puller, the worn bushing 80 can be readily replaced and new life is added to the puller.

As various possible embodiments might be made of the above invention, and as various changes might be made in the embodiments above set forth, it is to be understood that all matter herein set forth or shown in the accompanying drawings is to be interpreted as illustrative and not in a limiting sense.

What is claimed is:

1. A wheel hub puller for removing wheel hubs on cargo trailers, said puller comprising:
- housing means having a hub,
- bushing means loosely supported in said hub,
- holding means passing though said hub for loosely maintaining said bushing means in said hub,
- collar means on said bushing means for abutting said housing means,
- rod means threadedly movable through said bushing means and having a first end disposed inside said housing means,
- a contact pad disposed and loosely maintained on said first end of said rod means,
- mounting means integrally formed with said housing means adapted to be secured to a trailer wheel hub.

2. A wheel hub puller according to claim 1, wherein said bushing means is replaceably secured in said hub.

3. A wheel hub puller according to claim 1, wherein said mounting means comprises a flange integrally formed with said housing means, a plurality of apertures distributed in a predetermined manner along said flange, some of the apertures being symmetrically disposed opposite each other on diametric axes.

4. A wheel hub puller according to claim 1, wherein said mounting means comprises a drum integrally formed with said housing means, one end portion of said drum being provided with threads.

5. A wheel hub puller according to claim 1, wherein said housing means includes a thick base defining said hub, and a ridge extending from said base and concentrically located with respect to said hub for reinforcing said base.

6. A wheel hub puller according to claim 1, wherein said housing means comprises a cylindrical member integrally formed with a plate at one end, said plate integrally forming said hub, a pair of arms extending outwardly opposite each other from said plate, and a ridge extending from said plate and concentrically located with respect to said hub for reinforcing said plate.

7. A wheel hub puller according to claim 2, wherein the replaceable bushing means is made from steel which is milder than the steel forming the rod means.

8. A wheel hub puller according to claim 3, wherein the symmetrically disposed apertures are located on diametrical lines spaced angularly 30° and 60°, whereas the other apertures are angularly spaced from said diametrical lines by 35°, 70°, and 75°.

9. A wheel hub puller according to claim 8, wherein said apertures are circular.

10. A wheel hub puller according to claim 8, wherein said apertures are elongated radially.

11. A wheel hub puller for removing wheel hubs on cargo trailers, said puller comprising:
- housing means having a hub,
- bushing means loosely supported in said hub,
- holding means in said hub for maintaining said bushing means in said hub,
- collar means on said bushing means for abutting said housing means,
- rod means threadedly movable through said bushing means and having a first end disposed in said housing means,
- a contact pad disposed and loosely maintained on said first end of said rod means.

flange means disposed on and integrally formed with said housing means, said flange having a plurality of apertures distributed in a predetermined manner along said flange means, some of the apertures being disposed opposite to each other on diametrical axes, and a head disposed on a second end of said rod means, said head adapted to receive a torque force for rotatably moving said rod means through said bushing means.

12. A wheel hub puller for removing wheel hubs on cargo trailers, said puller comprising a tubular housing having at one end a hub, integrally formed mounting means disposed at the other end, said mounting means adaptable for securement to a trailer wheel hub, said hub having a bore, an internally threaded bushing loosely supported in said bore, a transverse opening in said hub communicating with said bore, a pin in said opening for replaceably maintaining said bushing in said bore, a collar on said bushing abutting an inner wall inside said housing, a rod having a threaded portion engaged with said bushing, one end of said rod inside said housing having a contact pad disposed and loosely maintained thereon for stationary engagement with a vehicle axle, the other end of said rod means housing a torque force receiving head.

13. A wheel hub puller according to claim 12, wherein the external diameter of said bushing is less than the diameter of said bore, and the diameter of said pin is less than the diameter of said hole, whereby said bushing has limited ranges of longitudinal and radial movements.

14. A wheel hub puller according to claim 12, wherein said mounting means comprises a flange extending from said housing, a plurality of symmetrical and non-symmetrical apertures circumferentially spaced along said flange, whereby some of said apertures are adapted to align with some threaded lugs on the wheel hub despite the configuration of a particular wheel hub.

15. A wheel hub puller according to claim 14, wherein the symmetrical apertures are arranged in pairs, the apertures of each pair are positioned on diameter axes opposite to each other, and the remaining apertures are spaced singly and angularly with respect to said diameter axes.

16. A wheel hub puller according to claim 14, wherein the apertures are circular.

17. A wheel hub puller according to claim 14, wherein the apertures are elongated radially.

18. A wheel hub puller according to claim 12, wherein said mounting means comprises an externally threaded portion on said housing adapted to engage internally threaded portions on the wheel hub, said housing having a pair of radially and oppositely extending arms for applying thread engaging movement to said puller.

* * * * *